Aug. 7, 1962  B. H. SLATTER  3,048,012
CONTROL SYSTEMS FOR GAS TURBINE ENGINES
Filed March 7, 1960  2 Sheets-Sheet 1

United States Patent Office 3,048,012
Patented Aug. 7, 1962

1

3,048,012
CONTROL SYSTEMS FOR GAS TURBINE ENGINES
Brian H. Slatter, Coventry, England, assignor to Bristol Siddeley Engines Limited, Bristol, England
Filed Mar. 7, 1960, Ser. No. 13,265
2 Claims. (Cl. 60—39.28)

The invention relates to a control system for a gas turbine engine.

A control system including an air/fuel ratio control has been described in patent specification No. 2,741,089. FIGURES 3 and 5 of that specification show an engine operating line E which is provided by the air/fuel ratio control to prevent the engine from stalling due to an excessive supply of fuel, when the throttle of the engine is suddenly opened. It has been found, however, that if the throttle control is roughly handled, i.e., if the engine is decelerated by the throttle control and the throttle control is immediately and suddenly opened, the air/fuel ratio control is unable to ensure that the operating line will not cross the stalling curve giving the limiting maximum values of fuel flow corresponding to compressor delivery pressure. An object of the present invention is to provide a control system in which the tendency for the engine to stall due to over-fueling on rough handling of the throttle control is reduced.

According to the present invention a control system for a gas turbine engine comprises an air/fuel ratio control unit, calibrated to provide a fuel delivery according to a predetermined relation between fuel delivery and compressor delivery pressure, and a trimming device operable on the air/fuel ratio control unit at a predetermined engine condition to reduce the calibration of the air/fuel ratio control unit to provide a lower relation between fuel delivery and compressor delivery pressure, the device including means providing a time lag, such that the air/fuel ratio control unit will retain the reduced calibration during rough handling of the throttle control, i.e., during deceleration by the throttle control followed immediately by a sudden opening of the throttle control.

Preferably the trimming device includes means responsive to compressor outlet temperature and arranged to operate a valve controlling the flow of compressed air from a compressor of the engine to the air/fuel ratio control unit, the response of the said means being slower than the change of temperature of the compressed air. The said means conveniently comprises an expansible probe positioned in the path of compressed air delivered by the compressor, the probe being shrouded, thereby to provide a time lag in the response of the probe to change of temperature of the compressed air.

Figure 1:
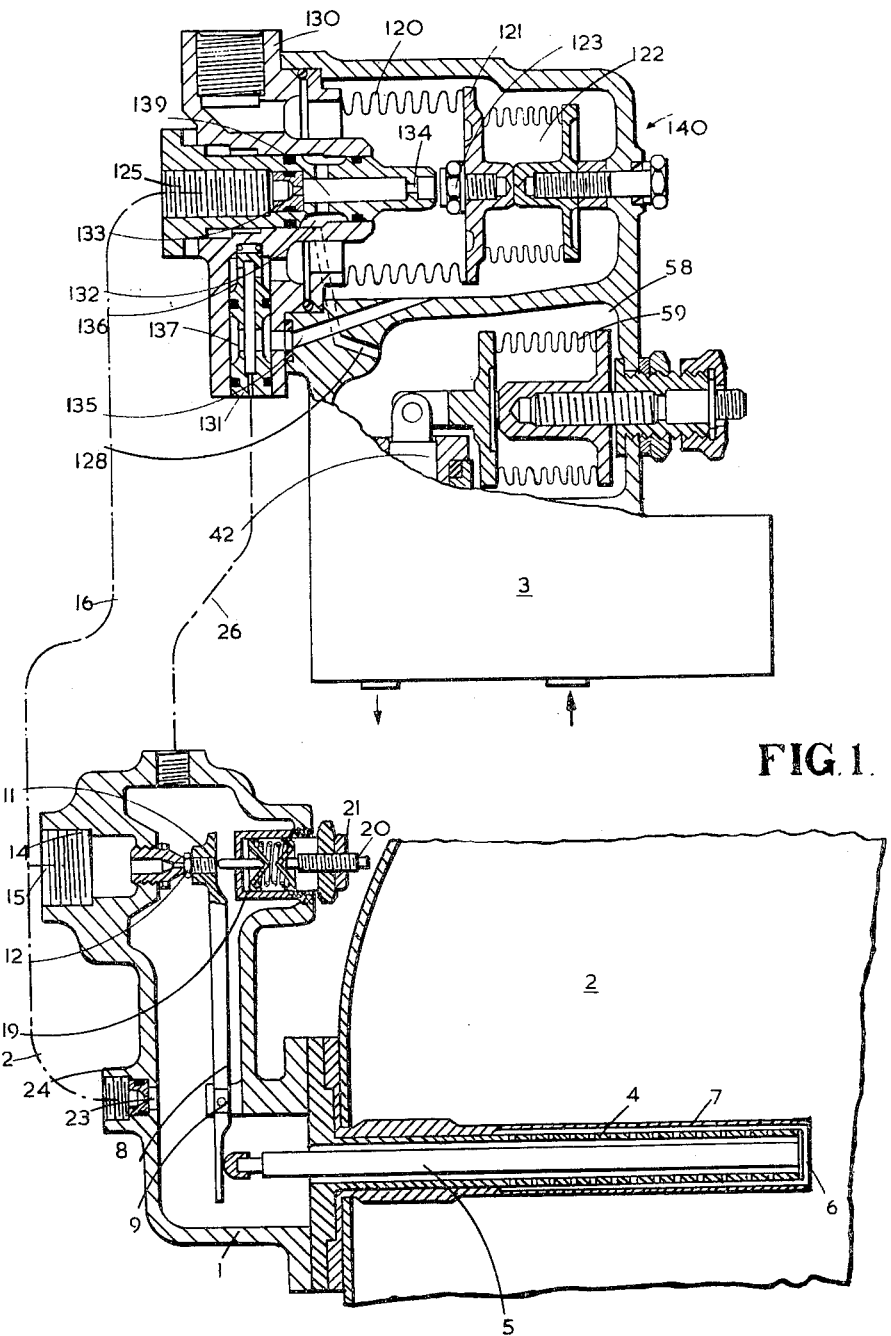
Figure 2:
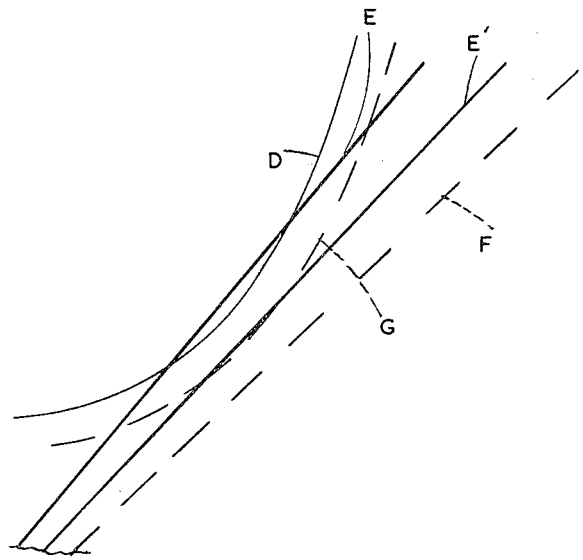

By way of example, a trimming device operable on the air/fuel ratio control of a gas turbine engine will now be described with reference to the accompanying drawings, in which:

FIGURE 1 is a part-sectional diagrammatic view of the trimming device and the air/fuel ratio control, and FIGURE 2 is a graph of fuel flow to the engine burners plotted against compressor delivery pressure and shows operating lines with and without the trimming device in operation.

The trimming device includes a housing 1, mounted on a gas turbine engine in the vicinity of the delivery duct 2 leading from a compressor of the engine and a probe comprising a perforated steel tube 4, extending from the housing 1 into the compressor delivery duct 2. In operation, compressed air flows through the perforations in the tube 4 into the housing 1 and passes to an air/fuel ratio control 3, as will be hereinafter described. Positioned inside the tube 4, with annular clearance therefrom, there is a rod 5 of a nickel-iron alloy, having a

2 low co-efficient of expansion. The end 6 of the tube 4, remote from the housing 1 is closed and one end of the rod 5 is secured to the end 6. The other end of the rod 5 extends into the housing 1 and is free to move relatively to the tube 4, so that when the tube expands or contracts due to change of temperature of the compressed air, flowing through the duct 2, the rod 5 will move longitudinally and relatively to the housing 1. The tube 4 is so shrouded by another tube 7 having annular clearance therefrom around the perforations, that the rate of heat transfer to and from the tube 4 is limited, thus creating a differential between the compressed air temperature and the temperature of the tube 4. The end of the shrouding tube 7, remote from the housing 1, is open so that compressed air can flow from the duct 2 into the tube 7 and then pass through the perforations in the tube 4 into the annular clearance around the rod 5 and from there into the housing 1. The free end of the rod 5 is arranged to engage one end of a rocker arm 8 pivoted at 9 to the housing 1; but the rod 5 is not attached to the rocker arm 8. The other end of the rocker arm 8 carries a valve member 11, arranged to co-operate with a valve seat 12. The valve seat 12 communicates with a socket 14 connected by pipes 15, 16 to an inlet 125 of the air/fuel ratio control unit 3. (The pipes 15 and 16 are indicated by broken lines.) The rocker arm 8 is so arranged, that when the compressed air, flowing through the duct 2, is comparatively cool, the rod 5 presses against the rocker arm 8 and causes the valve member 11 to be lifted off the seat 12 against the action of a compression spring 19, thus opening the seat 12. The biassing of the rocker arm 8 is such that when the compressed air, flowing through the duct 2, reaches a predetermined high temperature and the rod 5 moves in the opposite direction, the spring 19 moves the rocker arm 8 in the closing direction of the valve. FIGURE 1 shows the valve member 11 in its closed, i.e., "hot" position. Under very hot conditions, the free end of the rod 5 may leave the rocker arm 8, the valve member 11 still being maintained in its fully closed position by the spring 19. The initial compression of the spring 19 is adjusted by means of a screw 20 passing through a collar mounted in the housing 1, the screw being held in position by a lock nut 21. Sufficient clearance is provided in the housing 1, for the rocker arm 8 to move freely in opposition to the spring to an extreme open position, under excessively "cold" conditions, without risk of the rocker arm becoming bent. The pipe 16 is also connected by a pipe 22 to a connecting socket 24, containing a fixed restrictor 23, communicating with the interior of the housing 1. The restrictor 23 and the pipes 22 and 16 thus provide a connection between the housing 1 and the air/fuel ratio control inlet 125, whereby the valve 11, 12 is by-passed. There is also a pipe 26 connecting the housing 1 to another connection 131 of the air/fuel ratio control unit 3.

The air/fuel ratio control unit 3 is similar to that described and illustrated in FIGURE 4 of specification No. 2,741,089. Wherever possible, like reference numerals have been used to denote like parts. In the air/fuel ratio control unit 3, fuel flowing to the burners of the engine is controlled by a valve (not shown) carried on a pivoted arm 42. The arm 42 is moved in response to the expansion and contraction of a pressure sensitive capsule 59 in a chamber 58 of the unit. Air pressure is transmitted to the interior of the chamber 58 under the control of a switch responsive to compressor pressure ratio and denoted generally by reference 140. The pressure ratio switch includes a pressure sensitive capsule 120, which has a common wall 121 with a second capsule 122. The capsule 122 is smaller than the capsule 120 and is evacuated. The wall 121 carries a movable valve member 123 which closes the outlet from a restriction 134 in a passage 139, when a predetermined compressor pressure ratio is exceeded. The passage 139, when open, establishes a communication between the interior of the capsule 120 and the compressor delivery duct 2, through the inlet 125, the pipe 16, the housing 1 and the tube 4. Between the inlet 125 and the restriction 134, there is another restriction 133. An annular gallery 132, communicates with the passage 139, between the restrictions 133 and 134, and with a duct 128, leading to the chamber 58. When the valve member 123 is in the open position, there is flow of air through the pipe 16, the capsule 120 and an outlet 130 therefrom, communicating with the compressor intake or with atmosphere. As a result of this flow there are pressure drops in the restrictor 23, the valve 11, 12 (if open) and the restriction 133. The reduced pressure resulting from these pressure drops is transmitted to the chamber 58 through the duct 128. When the valve member 123 is in the closed position, there is no flow through the pipe 16 and the capsule 120. Therefore the full pressure at the inlet 125 is transmitted to the chamber 58.

Pressure from the housing 1 is also delivered through the pipe 26 and the connection 131 to an annular gallery 137, communicating, via a duct 135, with the exteriors of the capsules 120 and 122, the pressure in the chamber around the capsules 120, 122 acting on the capsule assembly in the direction for closing the valve member 123. Air from the connection 131, which has not flowed through the annular gallery 137, enters another annular gallery 136, which is in communication with the outlet 130 via the interior of the capsule 120.

Referring to FIGURE 2, in which fuel flow to the engine burners has been plotted against compressor delivery pressure, the curves D and G represent respectively, the engine stall lines at comparatively cold and hot conditions. When the engine is accelerated or decelerated by normal operation of the throttle control, the "cold" curve D gives the limiting maximum values of fuel flow corresponding to compressor delivery pressure required to prevent the engine from stalling. When the engine is handled roughly, i.e., the engine is decelerated by the throttle control, which is immediately and suddenly opened, the lower "hot" stall curve G applies only for a very short period during the rough handling. The line E shows the engine operating line produced by a normal setting of the air/fuel ratio control unit. This cuts the stall curve D; but due to correction devices, with which this invention is not concerned, the engine operating line follows the line E', outside the range in which the line E would have cut the stall curve D, if it had been followed. It will be noticed, however, that the line E' intercepts the "hot" stall curve G. This must not occur and therefore, in accordance with the present invention, a trimming device is provided, which, in operation, has the effect of lowering the operating line E' to the position denoted by the line F, which does not cross the stall line G. The operation of the trimming device according to the described example is as follows:

Compressed air passes from the compressor delivery duct 2, into the shrouding tube 7, through the perforations in the tube 4 and around the rod 5 into the housing 1. From there, the air passes through the by-pass restrictor 23 to the inlet 125 of the air/fuel ratio control unit 3 and also through the duct 26 connecting the housing 1 to the connection 131 and from there to the exterior of capsules 120, 122, via duct 135, and to the interior of capsule 120, via the gallery 136. At engine speeds below a predetermined value, the temperature of the compressed air, flowing through duct 2, will be such that the valve member 11 will be held away from the seat 12 by the rod 5 (i.e., not as shown in FIGURE 1). Thus compressed air will also pass from the housing 1 through the valve seat 12 and the pipe 16 to the inlet 125. The engine will then follow the operating line E' in accordance with the normal operation of the air/fuel ratio control. When the engine is accelerated, the compressed air temperature will increase, as this is a function of the engine speed at any given altitude. Therefore, the steel tube 4 will expand differentially with respect to the rod 5. At a predetermined high temperature, the force of the rod 5 on the end of the rocker arm 8 will be relaxed. The rocker arm 8 will then be moved by the spring 19 to the position, as shown in FIGURE 1, in which the valve 11, 12 is closed. The flow of compressed air, from the housing 1 to the inlet 125 of the air/fuel ratio control unit 3, will thus be limited to that flowing through the by-pass restrictor 23. The size of the by-pass restrictor 23 is such that the air/fuel ratio control unit 3 will then control the supply of fuel according to the lower operating line F.

On deceleration of the engine, the compressed air temperature will be reduced below the value at which the rod 5 will act on the rocker arm 8 to move the valve member 11 away from the seat 12; but due to the provision of the shrouding tube 7, the steel tube 4 will not immediately change in length and the valve 11, 12 will therefore remain closed for a short period. If the throttle control of the engine is then opened during the said short period (i.e., roughly handled), the engine will remain on the lower operating line F. Thus the throttle control can be roughly handled without risk of the engine stalling due to excessive supply of fuel. However, if the engine is decelerated slowly and the throttle is not immediately re-opened, the tube 4 will contact to its normal length and the rod 5 will act on the rocker arm, thereby moving the valve member 11 away from the seat 12. The normal upper operating line E' will then be followed by the air/fuel ratio control unit 3. When the valve member 123 is closed, i.e., when the aforesaid compressor pressure ratio is exceeded, the full compressor delivery pressure is transmitted to the chamber 58. The trimming device then has no further effect, until the valve member 123 opens again.

If the engine is not required to operate at greatly different altitudes, the pressure-ratio switch and the pipe 26 need not be provided. In that case the pipe 16 will communicate directly with the chamber 58, which must then be provided with a restricted bleed to atmosphere or the compressor inlet. The engine will then operate on lines E' and F only and not along line E.

What I claim as my invention and desire to secure by Letters Patent of the United States is:

1. A control system, for a gas turbine engine, comprising an air/fuel ratio control unit, calibrated to provide a fuel delivery according to a predetermined relation between fuel delivery and compressor delivery pressure, and a trimming device operable on the air/fuel ratio control unit at a predetermined engine condition to reduce the calibration of the air/fuel ratio control unit to provide a lower relation between fuel delivery and compressor delivery pressure, the device including a housing arranged to receive air from a delivery duct from a compressor of the engine; duct means connecting said housing to said air/fuel ratio control unit; a probe comprising a perforated tube extending from said housing into said delivery duct, a rod positioned within said perforated tube, one end of the rod being secured to the end of the tube remote from said housing, and a shrouding tube positioned around said perforated tube along the whole length thereof, there being annular clearance between said shrouding tube and said perforated tube, to allow the passage of air to said perforated tube, the coefficient of expansion of said perforated tube being considerably greater than that of said rod, the device also including a lever, mounted in the housing and arranged to be engaged by the other end of said rod, a valve controlling the flow of air from said housing through said duct means and arranged to be actuated by said lever, a restricted outlet from said housing and further duct means connecting said restricted outlet to said air/fuel ratio control unit, said restricted outlet thereby providing a by-pass around said valve.

2. A control system, for a gas turbine engine, comprising an air/fuel ratio control unit, calibrated to provide a fuel delivery according to a predetermined relation between fuel delivery and compressor delivery pressure, and a trimming device operable on the air/fuel ratio control unit at a predetermined engine condition to reduce the calibration of the air/fuel ratio control unit to provide a lower relation between fuel delivery and compressor delivery pressure, the device including a housing arranged to receive air from a delivery duct from a compressor of the engine; duct means connecting said housing to said air/fuel ratio control unit; an expansible probe extending from said housing into said delivery duct, a shrouding tube positioned around said probe and extending along the whole length of that portion of the probe positioned within said delivery duct, thereby to provide a time lag in the response of the probe to change of temperature of the compressed air, a first outlet port in said housing, said first port communicating with said duct means; a valve for controlling flow of air from said housing through said first port; a member arranged to actuate said valve, said member being operable by movement of said probe, and a second outlet port in said housing, said second port also communicating with said duct means and providing a by-pass flow path around said valve.

References Cited in the file of this patent

UNITED STATES PATENTS

| | | |
|---|---|---|
| 2,312,671 | Otto | Mar. 2, 1943 |
| 2,404,428 | Bradbury | July 23, 1946 |
| 2,673,556 | Reggio | Mar. 30, 1954 |
| 2,741,089 | Jagger | Apr. 10, 1956 |

FOREIGN PATENTS

| | | |
|---|---|---|
| 785,949 | Great Britain | Nov. 6, 1957 |